United States Patent [19]
Vignali

[11] Patent Number: 6,099,633
[45] Date of Patent: Aug. 8, 2000

[54] COMPOSITION BASED ON TUNGSTEN AND CHROMIUM AQUEOUS SOLUTIONS SUITABLE FOR COLORING CERAMIC MANUFACTURED ARTICLES AND RELEVANT HIGH TEMPERATURE COLORING PROCESS

[76] Inventor: Graziano Vignali, Via della Pace, 2, 40037 Sasso Marconi (Prov. of Bologna), Italy

[21] Appl. No.: 09/217,486

[22] Filed: Dec. 21, 1998

[30] Foreign Application Priority Data

Dec. 24, 1997 [IT] Italy .................................. MI97A2874

[51] Int. Cl.⁷ ........................... C04B 41/82; C04B 41/87; C04B 33/14; C04B 33/34
[52] U.S. Cl. ....................... 106/287.18; 106/453
[58] Field of Search ................ 106/287.18, 453

[56] References Cited

U.S. PATENT DOCUMENTS 4,908,065  3/1990  Tanitsu et al. ..................... 106/287.24

FOREIGN PATENT DOCUMENTS

| 0704411 | 4/1996 | European Pat. Off. . |
| 2012304 | 9/1971 | Germany . |
| 2605651 | 8/1977 | Germany . |
| 19701080 | 1/1997 | Germany . |
| 1071659 | 2/1984 | U.S.S.R. ........................... 106/287.18 |
| 9738952 | 10/1997 | WIPO . |

OTHER PUBLICATIONS

English abstract of Swiss patent 575,894 (May 1976).
English abstract of Sprechsal, vol. 119, No. 10 (1986) no month provided.

*Primary Examiner*—David Brunsman
*Attorney, Agent, or Firm*—Hedman, Gibson & Costigan, P.C.

[57] ABSTRACT

Composition whereby ceramic manufactured articles, obtained by molding pressing a ceramic mixture added with 1% to 10% $TiO_2$ by wt., are colored in shades from yellow ocher to sienna, said composition being an aqueous or hydroalcoholic solution including tungsten and chromium inorganic compounds or organic derivatives, which is applied by controlled absorption to the surface of the ceramic material before firing.

6 Claims, No Drawings

COMPOSITION BASED ON TUNGSTEN AND CHROMIUM AQUEOUS SOLUTIONS SUITABLE FOR COLORING CERAMIC MANUFACTURED ARTICLES AND RELEVANT HIGH TEMPERATURE COLORING PROCESS

FIELD OF THE INVENTION

The present invention relates to compositions suitable for coloring ceramic manufactured articles and the relevant coloring process.

In particular, the compositions of the invention consist of aqueous solutions of tungsten and chromium salts or organic complexes which impart a particular colour to ceramic manufactured articles, when used on supports modified with an addition of TiO2. Furthermore, to obtain particular shades, said solutions may be mixed with solutions of other cations.

STATE OF THE ART

The use of coloured ceramic manufactured articles as well as the compositions and procedures adopted to obtain the relevant colours have been known since long time. One of the methods most commonly used consists in the addition of powdered pigments, in particular inorganic oxides and other mineral pigments, to the ceramic mixture (vitrified stoneware) before firing. The ceramic manufactured article is thus coloured through its whole thickness, although with large consumption of colouring matter, which is the most expensive component.

Being superfluous to colour the inside of the ceramic manufactured article, due to the material non-transparency, efforts have been made to find new methods for colouring only the surface of the ceramic material, with considerable saving of costly materials.

A procedure consists in making the surface of the ceramic material absorb, either after partial burning (as disclosed e.g. in German patent 2,012,304) or simply after molding pressing and before burning (as disclosed e.g. in Swiss patent 575,894), an aqueous solution of inorganic salts or metal complexes (as disclosed e.g. in Sprechsal, vol. 119, No. 10, 1986, in EP 0 704 411 and in patent PCT WO 97/38952), which become stable colours at high temperature during the firing cycle of the ceramic manufactured article.

The aqueous solution is applied to the ceramic material, e.g. by immersion, spraying, disk, and silk-screen techniques, before final firing.

This procedure is particularly advantageous because it allows the colouring of very thin layers: therefore, it is widely used for flat manufactured articles (such as e.g. floor and wall tiles).

Of great importance is the application technique: in particular, the quantity of colouring solution that may be applied by disk and spraying techniques is as high as 400 to 600 g/m2; by silk-screen type techniques it usually amounts to 100 to 200 g/m2 and sometimes even to 400 g/m2.

Silk-screen type techniques are very much in demand, being the only techniques allowing graphic decorations and drawings, and requiring lower quantities of colouring matter.

Colour penetration into the ceramic material before firing is obtained with relatively high quantities of water or of other liquids after application of the colouring solution. However, the resulting colours are less intense than those obtained using other techniques.

Colour penetration into the material is of cardinal importance in the case of "smoothed" vitrified stoneware tiles.

The term "smoothed" means that the vitrified stoneware surface has been abraded with diamond wheels by 0.8 to 1.5 mm, smoothed and polished with appropriate felt until obtaining a glassy surface.

It follows that colour penetration into stoneware articles to be smoothed after burning must reach a depth of at least 1.6 mm.

In other cases, only a very thin surface layer (1 to 10$\mu$) can be smoothed and then polished.

TECHNICAL PROBLEM

Considering that it is very simple to colour ceramic materials by disk and spraying techniques, the ceramic industry is highly interested in finding new substances to be used therewith.

As concerns said new substances, the technical problems to be solved are: they must become stable colours at a high temperature; the manufactured article has to be coloured in the desired shades without too high consumption of colouring matter; the colouring matter has to penetrate deeply into the ceramic manufactured article.

Unfortunately, very few are the colours available so far. In particular, the lack of various shades of red, green, yellow and yellow ocher is deeply felt, especially by the industry of vitrified stoneware, which must propose ever new aesthetic solutions.

Furthermore, since yellow is a primary colour, the lack of substances producing it in its various shades makes it impossible to obtain other colours.

DETAILED DESCRIPTION OF THE INVENTION

The Applicant, who has full-fledged experience in the production and sale of colouring matters for ceramic tiles, has now found that aqueous or hydroalcoholic solutions of tungsten and chromium inorganic salts or organic complexes can be used to obtain—after firing—shades of colours varying from yellow ocher to raw sienna.

The resulting shades depend on the tungsten/chromium weight ratio in the solution and on the content of $TiO_2$, optionally also of $Al(OH)_3$, in the support (before firing).

It is a fundamental feature of the present invention to apply aqueous or hydroalcoholic solutions of tungsten and chromium inorganic salts or organic complexes to ceramic supports added, before firing, with 1% to 10% by wt. $TiO_2$, to obtain, after firing, yellow ocher to sienna colours on supports.

According to another fundamental feature of the invention, it is possible to mix the aforesaid inorganic salts or organic complexes with other salts or organic complexes of metals as found in commerce to obtain colours or shades not yet available.

Sulphuric, hydrochloric, and nitric acid salts are particularly cheap and suitable for obtaining the desired colours, but suffer from the disadvantage of releasing corrosive vapours during the burning cycle. It follows that kilns are to be provided with vapour neutralisation equipment. Therefore, whenever possible, it is preferable to use ammonium salts or alkaline or alkaline-earth metal salts of tungstic acid, or organic complexes of tungsten and organic complexes of chromium, that during the firing cycle of the treated products, undergo thermal decomposition yielding water and carbon dioxide.

Particularly useful are the salts of mono- or polycarboxylic organic acids, either aliphatic or aromatic, containing 1 to 18 carbon atoms, optionally with one to five hydroxylic or aminic or thiolic substituents in the aliphatic chain or on the aromatic ring.

The following compounds are reported by way of example, not of limitation, of the present invention: the salts of acetic, formic, propionic, butyric, lactic, glycolic, tartaric, citric, oxalic, maleic, citraconic, fumaric, gluconic, glycine, aminoadipic, aminobutyric, aminocaproic, aminocaprylic, 2-amino-1-hydroxy-butyric, amino isobutyric, aminolevulinic, thioglycolic, ethylenediaminetetraacetic, benzoic, salicylic acids.

The quantity of inorganic salts and organic complexes to be added to the ceramic material before firing to obtain the desired colour is so adjusted as to apply from 5 to 100 g/m2 tungsten, and from 0.8 to 30 g/m2 chromium (expressed as elements) on the surface of the material to be coloured.

By increasing the chromium concentration, colours gradually turn from light yellow ocher to dark yellow ocher to sienna: with a tungsten/chromium ratio equal to 12 by weight, the colour obtained is pale yellow ocher, while with a ratio of 2 the colour is dark sienna (burnt sienna).

Clearly it is also important working condition the cation concentrations in the solution, because more diluted is the solution higher is the quantity to apply causing in several cases the surface flakes off.

For the above mentioned reason solutions should be used at the highest concentration possible.

The typical process of the invention for applying colouring compositions consists of the following steps:

a) drying at 100° C. of the molded article to be coloured to a water residue of 0.5% by wt. max.;

a.1) optional pretreatment of the dried product with water up to a max. quantity of 300 g/m2 of ceramic manufacture;

b) treatment of the product from step a) or a.1) with an aqueous solution of the colouring composition in a quantity of 60 to 600 g/m2 of the final coloured surface;

b.1) optional post-treatment of the treated product with water up to a max. quantity of absorbed water of 300 g/m2 of treated product;

c) equalization of the product from step b) or b.1) at room temperature for 8 h to homogenize the absorption of the solution;

d) kiln firing according to the usual ceramic cycle.

The colouring composition can be applied to ceramic manufactured articles also by the silk-screen technique: in this case, to obtain a mixture of an appropriate consistency, the aqueous solution is to be added with known thickening agents, such as for example glucomannans, modified cellulose or starch derivatives.

The compositions (% by weight) of the ceramic materials used in runs 1 to 12 (Table 1) are reported herein:

A) $SiO_2$ 64.4%, $Al_2O_3$ 21.8%, $K_2O$ 3.8%, $Na_2O$ 0.8%, CaO 0.6%, MgO 0.1%, $TiO_2$ 0.4%, $Fe_2O_3$ 0.2%, $ZrSiO_4$ 5%, $H_2O$ q.s. to 100%.

B) $SiO_2$ 64.4%, $Al_2O_3$ 21.8%, $K_2O$ 3.8%, CaO 0.6%, MgO 0.1%, $TiO_2$ 3.4%, $Fe_2O_3$ 0.2%, $H_2O$ q.s. to 100%.

Remark: The titanium oxide of mixture A is a clay derivative, whereas the titanium oxide of mixture B is due to the addition of 3% titanium oxide.

TEST 1 TO 12

A series of colouring tests was carried out according to the following procedure: some 33×33 cm tiles were press molded, dried at 100° C. to a water residue of 0.1% (weight loss after 4 h at 120° C.), allowed to cool to room temperature, sprayed with 50 g/m2 distilled water (pretreatment), and then with 250 g/m2 aqueous solution of the colouring matter (treatment).

The treated tiles were allowed to stand 8 h at room temperature (equalization) and burnt in a roll-type kiln according to a standard firing cycle of vitrified stoneware (T1200° C. max.).

After firing, a tile was divided into sections, and colour penetration was measured by optical microscope.

Another tile was smoothed with diamond wheels, with removal of a 1.2 mm layer. At the end of said operation, the colour was recorded.

The data concerning the parameters used in the various tests are reported in Table 1.

TABLE 1

| (1) | (2) | (3) % W, % Cr | (4) | (5) | (6) |
|---|---|---|---|---|---|
| (*) 1 | B | 18 0.67 | 1.8 | extremely pale yellow | ice grey with very light green component |
| (*) 2 | A | 16 1.3 | 1.8 | beige | light beige |
| 3 | B | 16 1.3 | 1.8 | yellow ocher | pale yellow ocher |
| (*) 4 | A | 14 2 | 1.8 | greenish beige | beige |
| 5 | B | 14 2 | 1.8 | dark yellow ocher | yellow ocher |
| (*) 6 | A | 12 2.7 | 1.8 | greenish beige | pale greyish-green |
| 7 | B | 12 2.7 | 1.8 | sienna | dark yellow ocher |
| (*) 8 | A | 10 3.4 | 1.8 | greenish grey | intense greyish-green |
| 9 | B | 10 3.4 | 1.8 | dark sienna | sienna |
| (*) 10 | A | 8 4 | 1.8 | dark greyish-green | dark greyish-green |
| 11 | B | 8 4 | 1.8 | dark sienna | dark sienna |
| (*) 12 | B | 6 4.7 | 1.8 | sienna (darker than in test 11, non-smoothed) | sienna (darker than in test 11, smoothed) |

(1) Test number.
(2) Mixture used.
(3) Tungsten and chromium content (% by wt. as element) in the solution. Tungsten is used as sodium tungstate, chromium as chromium 2-hydroxy-1,2,3-hydroxycarbonylpropane.
(4) Colour penetration (mm).
(5) Surface colour before smoothing.
(6) Surface colour after smoothing.
(*)Comparison tests.

The results listed in Table 1 show that, to obtain shades from yellow ocher to sienna, the mixture forming the support must necessarily be added not only with tungsten and chromium, in the stated ration W/Cr, but also with titanium oxide.

What is claimed is:

1. Composition whereby ceramic manufactured articles, obtained by molding a ceramic mixture added with 1% to 10% $TiO_2$ by wt., are colored in shades from yellow ocher to sienna, said composition being an aqueous or hydroalcoholic solution including tungsten and chromium inorganic compounds or organic derivatives, which is applied by controlled absorption to the surface of the ceramic material before firing.

2. The composition as claimed in claim 1, wherein chromium and tungsten compounds are selected among the salts of mono- or polycarboxylic organic acids, either aliphatic or aromatic, containing 1 to 18 carbon atoms, optionally with one to five hydroxylic or aminic or thiolic substituents, in the aliphatic chain or on the aromatic ring.

3. The composition as claimed in claim 1, wherein Cr and W inorganic salts, such as sulphates, chlorides, nitrates, are used.

4. The composition as claimed in claim 1, wherein the tungsten compound is an alkaline or alkaline-earth salt or an ammonic salt of tungstic acid.

5. The composition as claimed in claim 1, wherein the Cr and W concentration in the solution is such that the ratio W/Cr is comprised between 12/1 and 2/1 by weight.

6. The composition as claimed in claim 1, wherein the Cr and W concentration in the solution is such that by applying same to the ceramic surface to be colored the quantity of the applied W is from 5 to 100 g/m2 and of Cr is 0.8 to 30 g/m2.

* * * * *